(12) United States Patent
Kim et al.

(10) Patent No.: US 7,769,390 B2
(45) Date of Patent: Aug. 3, 2010

(54) APPARATUS AND METHOD FOR TRANSMITTING AND RECEIVING DATA IN MULTIUSER MIMO SYSTEM

(75) Inventors: Ho-Jin Kim, Seoul (KR); Sung-Jin Kim, Suwon-si (KR); Kwang-Bok Lee, Seoul (KR)

(73) Assignees: Samsung Electronics Co., Ltd (KR); Seoul National University Industry Foundation (KR)

( * ) Notice: Subject to any disclaimer, the term of this patent is extended or adjusted under 35 U.S.C. 154(b) by 915 days.

(21) Appl. No.: 11/059,962

(22) Filed: Feb. 17, 2005

(65) Prior Publication Data

US 2005/0192019 A1      Sep. 1, 2005

Related U.S. Application Data

(60) Provisional application No. 60/545,422, filed on Feb. 17, 2004.

(30) Foreign Application Priority Data

Jan. 5, 2005     (KR)     ............... 10-2005-0000818

(51) Int. Cl.
*H04W 72/00*     (2009.01)
(52) U.S. Cl. .................. 455/452.2; 455/452.1; 455/450
(58) Field of Classification Search ................. 370/334, 370/338, 444; 375/267; 455/512, 450, 452.1, 455/452, 562.1, 452.2
See application file for complete search history.

(56) References Cited

U.S. PATENT DOCUMENTS 6,662,024 B2 *  12/2003  Walton et al. ............ 455/562.1
6,859,503 B2 *   2/2005  Pautler et al. ............... 375/299
2003/0078074 A1 *  4/2003  Sesay et al. ................. 455/561
2005/0002468 A1 *  1/2005  Walton et al. ............... 375/267

FOREIGN PATENT DOCUMENTS

| WO | WO0203568 A1 * | 1/2002 |
| WO | WO 02/082689 | 10/2002 |
| WO | WO 02/093784 | 11/2002 |
| WO | WO 02/093819 | 11/2002 |
| WO | WO 03/058871 | 7/2003 |

OTHER PUBLICATIONS

Robert W. Heath Jr et al., "Multiuser Diversity for MIMO Wireless System With Linear Receivers", In: IEEE Asilomar Conf. On Signals, Systems, and Computers, pp. 1196-1199, Nov. 7, 2001.

* cited by examiner

*Primary Examiner*—Charles N Appiah
*Assistant Examiner*—Emem Stephen
(74) *Attorney, Agent, or Firm*—The Farrell Law Firm, LLP

(57) ABSTRACT

A method for transmitting and receiving data in a multiuser Multiple-Input Multiple-Output (MIMO) system including a base station connected to a plurality of user equipments. In the method, each of the user equipments separately calculates channel capacity information using a linear reception scheme and a nonlinear reception scheme, and feeds back the calculated channel capacity information to the base station. The base station separately calculates system capacities using at least two different antenna scheduling schemes based on the channel capacity information fed back from the user equipments, and allocates antennas to the user equipments using a selected antenna scheduling scheme having higher system capacity out of the two antenna scheduling schemes.

3 Claims, 3 Drawing Sheets

APPARATUS AND METHOD FOR TRANSMITTING AND RECEIVING DATA IN MULTIUSER MIMO SYSTEM

PRIORITY

This application claims priority under 35 U.S.C. §119 to an application entitled "Apparatus and Method for Transmitting/Receiving Data in a Multiuser MIMO System" filed in the United State Patent and Trademark Office on Feb. 17, 2004 and assigned Ser. No. 60/545,422, and an application entitled "Apparatus and Method for Transmitting/Receiving Data in a Multiuser MIMO System" filed in the Korean Intellectual Property Office on Jan. 5, 2005 and assigned Serial No. 2005-818, the contents of both of which are incorporated herein by reference.

BACKGROUND OF THE INVENTION

1. Field of the Invention

The present invention relates generally to an apparatus and method for transmitting and receiving data in a multiuser Multiple-Input Multiple-Output (MIMO) system, and in particular, to an apparatus and method for transmitting and receiving data in a multiuser MIMO system in which a base station adaptively selects an antenna scheduling scheme.

2. Description of the Related Art

The existing wireless mobile communication systems provide voice-oriented services and mostly depend on channel coding to overcome any inferiority of channels. However, due to the increasing demands for a high-quality multimedia service in which users can communicate with anyone regardless of time and place, the existing services are evolving into data-oriented services. Accordingly, there is a high demand for next generation wireless transmission technology for transmitting the larger amount of data at a lower error rate. In particular, it is very important to transmit data at a high rate in a link in which the amount of required data is large.

For the next generation wireless communication, various antenna systems have been proposed. For example, a MIMO system, i.e., a typical antenna system, increases spectrum efficiency through all of transmission antennas without excessive use of a frequency bandwidth. Generally, MIMO is classified into Space-Time Coding (STC), Diversity, Beam Forming (BF), and Spatial Multiplexing (SM) according to the transmission structure and scheme of a transmitter, all of which provide high data rate and reliability.

When various antenna systems are used in a transmission side or a reception side, a scheduling scheme serves as the most important factor in determining system capacity in a multiuser MIMO environment in which different transmission antennas can be simultaneously allocated for data transmission of specific users. As cellular networks tend to use the increasing number of transmission/reception antennas and service the increasing number of users, a scheduling algorithm plays an important role in complicated system scenarios.

A transmission antenna scheduling scheme for users includes various resource (i.e., transmission antennas) allocation schemes. For example, all of transmission antennas are allocated to one user, or the transmission antennas are allocated to different users according to link conditions between the transmission antennas and reception antennas.

The reception side is implemented with linear Zero-Forcing (ZF), Minimum Mean-Squared Error (MMSE), Successive Interference Cancellation (SIC), Ordered SIC, Sphere Decoding, and Maximum Likelihood, and an increase in performance of those schemes undesirably increases complexity of the implementation.

Therefore, in the wireless communication system, the best system capacity is determined according to the type of the MIMO system, the type of the scheduling scheme, and the implementation method of the reception side. Accordingly, the implementation can be achieved in different manners according to purposes of the system.

SUMMARY OF THE INVENTION

The present invention adaptively implements an antenna scheduling scheme according to a structure of a reception side and a number of users in a multiuser MIMO system.

The present invention adaptively implements an antenna scheduling scheme according to a number of users for a reception side having both linear and nonlinear characteristics in a multiuser MIMO system.

According to one aspect of the present invention, there is provided a method for transmitting and receiving data in a multiuser Multiple-Input Multiple-Output (MIMO) system including a base station connected to a plurality of user equipments. In the method, each of the user equipments separately calculates channel capacity information using a linear reception scheme and a nonlinear reception scheme, and feeds back the calculated channel capacity information to the base station. The base station separately calculates system capacities using at least two different antenna scheduling schemes based on the channel capacity information fed back from the user equipments, and allocates antennas to the user equipments using a selected antenna scheduling scheme having higher system capacity out of the two antenna scheduling schemes.

According to another aspect of the present invention, there is provided a method for transmitting and receiving data in a multiuser Multiple-Input Multiple-Output (MIMO) system in which a base station allocates antennas based on channel state information received from terminals located within its coverage. The method includes the steps of calculating an entire system capacity using at least two reception schemes based on channel state information received from all of the terminals; selecting a reception scheme having a higher entire system capacity among the reception schemes; allocating antennas using a transmission antenna allocation scheme corresponding to the selected reception scheme.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Preferred embodiments of the present invention will now be described in detail herein below with reference to the annexed drawings. In the following description, a detailed description of known functions and configurations incorporated herein has been omitted for conciseness.

Figure 1:
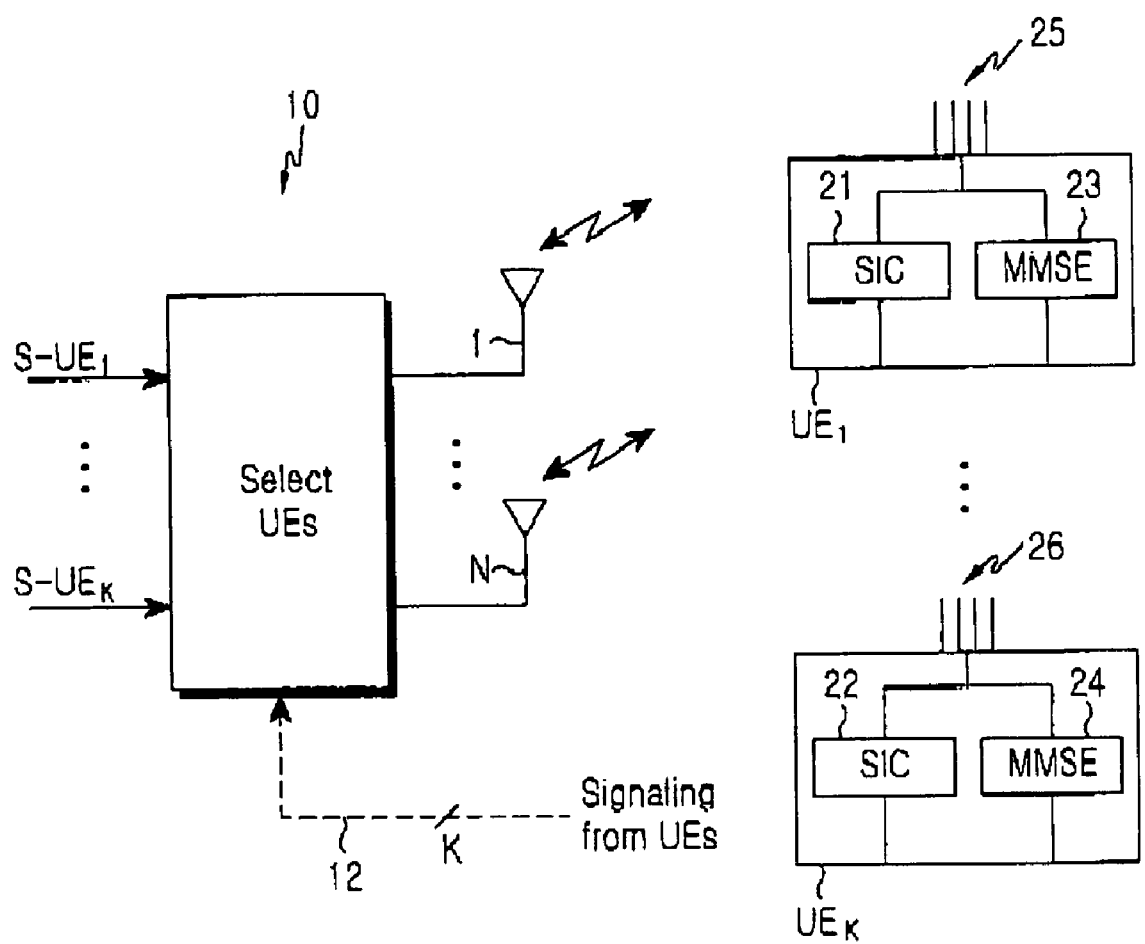
FIG. 1 is a block diagram illustrating an apparatus for transmitting and receiving data in a multiuser MIMO system according to an embodiment of the present invention.

FIG. 1 is a block diagram illustrating an apparatus for transmitting and receiving data in a multiuser MIMO system according to an embodiment of the present invention. As illustrated in FIG. 1, in the multiuser MIMO system, each cell includes a base station 10 and a plurality of user equipments (or terminals) $UE_1$ to $UE_k$.

The base station 10, which includes a plurality of antennas ANT#1 to ANT#N, transmits signals $S\text{-}UE_1$ to $S\text{-}UE_k$ to their associated user equipments $UE_1$ to $UE_k$. The present invention can use Max Link Technique (MLT) and Independent Stream Technique (IST) as a base station antenna scheduling scheme for multiple user equipments. More specifically, MLT is a scheme for allocating all of transmission antennas to a single user equipment, and IST is a scheme for allocating transmission antennas to different user equipments, wherein each user equipment can be allocated 0, 1, or more than one transmission antennas.

The base station 10 receives feedback information 12 from the respective user equipments $UE_1$ to $UE_k$ for scheduling on the transmission antennas ANT#1 to ANT#N. The received feedback information 12 is information on channel capacities calculated in the respective user equipments $UE_1$ to $UE_k$, and the base station 10 selects an antenna scheduling scheme capable of implementing the best system capacity, using the feedback information 12 and the number of the user equipments $UE_1$ to $UE_k$ currently connected to the base station 10. That is, depending on the number of the user equipments $UE_1$ to $UE_k$ currently connected to the base station 10, the base station 10 determines which of an operation of allocating the transmission antennas ANT#1 to ANT#N to the user equipments $UE_1$ to $UE_k$ with the MLT scheme and an operation of allocating the transmission antennas ANT#1 to ANT#N to the user equipments $UE_1$ to $UE_k$ with the IST scheme is efficient in implementing the best system capacity, and schedules the transmission antennas ANT#1 to ANT#N with the scheme selected for maximizing the system capacity.

The user equipments $UE_1$ to $UE_k$ each include a plurality of antennas 25 and 26, and use both SICs 21 and 22 having a nonlinear characteristic and MMSEs 23 and 24 having a linear characteristic. Therefore, upon receiving signals from the base station 10, the user equipment $UE_1$ to $UE_k$ each separately calculate channel capacities for the SIC schemes 21 and 22 and the MMSE schemes 23 and 24, and feed back the corresponding information to the base station 10. If the base station 10 allocates the transmission antennas ANT#1 to ANT#N with the MLT scheme, the user equipments $UE_1$ to $UE_k$ each receive data with the SIC schemes 21 and 22. If the base station 10 allocates the transmission antennas ANT#1 to ANT#N with the IST scheme, the user equipments $UE_1$ to $UE_k$ each receive data with the MMSE schemes 23 and 24.

Accordingly, a scheduling scheme for the transmission antennas ANT#1 to ANT#N is selected according to the feedback information 12 from the user equipments $UE_1$ to $UE_k$. However, the number of user equipments $UE_1$ to $UE_k$ connected to the base station 10 is subject to change because of movement of the user equipments $UE_1$ to $UE_k$. Therefore, the base station 10 continuously receives the feedback information 12 from the user equipments $UE_1$ to $UE_k$ using a control signal (for example, a pilot signal) that enables the user equipments $UE_1$ to $UE_k$ to continuously calculate their channel capacity information and feed back the calculated channel capacity information to the base station 10. Further, the base station monitors system capacity in real time based on the received feedback information 12, and adaptively selects an antenna scheduling scheme according to the monitoring result. For example, a user equipment, which is currently connected to the antennas of the base station 10 with the MLT scheme and performs communication using an SIC reception scheme, can later be connected to the antennas of the base station 10 with the IST scheme and perform communication using an MMSE reception scheme due to a change in the number of the user equipments connected to the base station 10.

Figure 2:
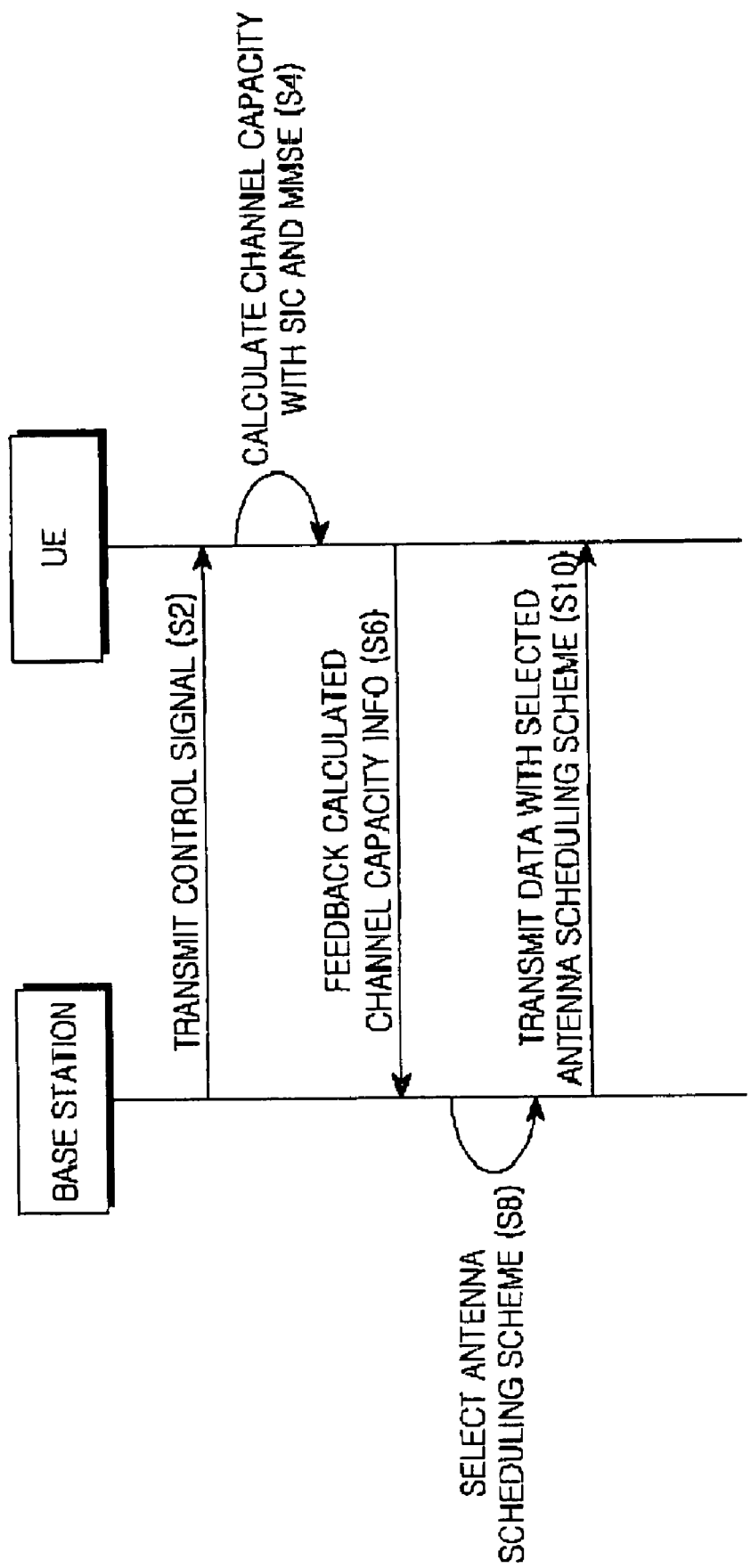
FIG. 2 is a signaling diagram illustrating a method for transmitting and receiving data in a multiuser MIMO system according to an embodiment of the present invention.

FIG. 2 is a signaling diagram illustrating a method for transmitting and receiving data in a multiuser MIMO system according to an embodiment of the present invention. Referring to FIG. 2, in order to determine an antenna scheduling scheme for data transmission, a base station transmits to user equipments a control signal that enables the user equipments to continuously calculate their channel capacity information and feed back the calculated channel capacity information to the base station, in step S2.

In step S4, each user equipment receives the control signal using both the SIC scheme and the MMSE scheme, and calculates channel capacity according to the control signal. Herein, a signal-to-noise ratio (SNR) of a channel established from an $m^{th}$ transmission antenna to a $k^{th}$ user equipment is denoted by $\gamma_{k,m}$ and channel capacity calculated using this SNR value is denoted by $c_f(\gamma_{k,m}(t))$.

In step S6, the user equipment feeds back the channel capacity information $c_f(\gamma_{k,m}(t))$ calculated with the SIC reception scheme and MMSE reception scheme to the base station.

In step S8, the base station determines whether it will schedule antennas using the MLT scheme or the IST scheme. Accordingly, the base station selects a scheme suitable to maximize system capacity, using the channel capacity information fed back from the user equipment.

When scheduling antennas using the MLT scheme, the base station searches for a $k^{th}$ user equipment where the sum of capacities for all of m transmission antennas is maximized. When antennas are scheduled using the MLT scheme, system capacity can be expressed as Equation (1).

$$C_M(t) = \max_k \sum_m c_f(\gamma_{k,m}(t)) \tag{1}$$

When antennas are scheduled using the IST scheme, capacity of each transmission antenna should be maximized. That is, when antennas are scheduled using the IST scheme, system capacity is equal to the sum of capacities of the respective transmission antennas, as can be expressed in Equation (2).

$$C_I(t) = \sum_m \max_k c_f(\gamma_{k,m}(t)) \tag{2}$$

After calculating $C_M(t)$ and $C_I(t)$, in step S10, the base station selects a larger value out of the $C_M(t)$ value and the $C_I(t)$ value, allocates antennas to the user equipment using a scheme corresponding to the selected value, and transmits data to the user equipment as can be expressed in Equation (3).

$$C_H(t) = \max\{C_M(t), C_I(t)\} \tag{3}$$

All of the foregoing processes are periodically performed between the base station and the user equipment. Therefore, the base station can actively cope with a change in the number of user equipments connected to the base station.

Figure 3:
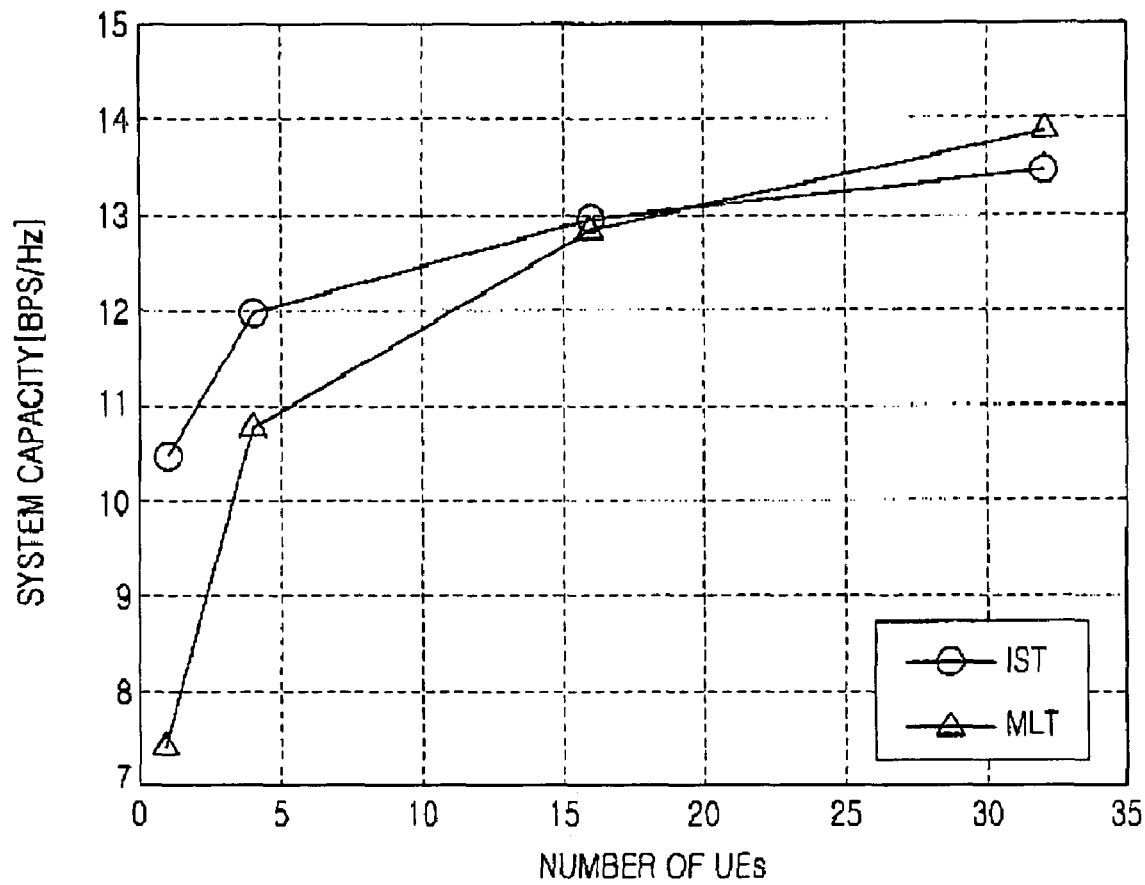
FIG. 3 is a graph illustrating a relationship between system capacities and antenna scheduling schemes.

FIG. 3 is a graph illustrating a relationship between system capacities and antenna scheduling schemes. As illustrated, the system capacity increases with the number of user equipments, regardless of the type of the scheduling scheme. However, if the number of user equipments exceeds a predetermined value, the MLT scheme is superior to the IST scheme in terms of system capacity.

In summary, in the present invention, the base station periodically monitors system capacity and adaptively selects the best antenna scheduling scheme according to a change in number of user equipments.

As described above, the present invention compares a system capacity between a system implemented with a linear MMSE reception scheme and an IST antennal scheduling scheme, and a system implemented with a nonlinear SIC reception scheme and an MLT antenna scheduling scheme, and selects an antenna scheduling scheme having higher system capacity according to the comparison result, thereby providing a multiuser MIMO system which can implement the best system capacity in real time according to the number of user equipments connected to a base station.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A multiuser Multiple-Input Multiple-Output (MIMO) system for transmitting and receiving data, the system comprising:

a plurality of user equipments, wherein each of the plurality of user equipments calculates a set of channel capacity information using a linear reception scheme and a set of channel capacity information using a nonlinear reception scheme, and the sets of channel capacity information are fed back from the plurality of user equipments; and a base station for receiving the sets of channel capacity information fed back from the plurality of user equipments, separately calculating system capacities using at least two different antenna scheduling schemes based on the sets of channel capacity information, wherein at least one antenna scheduling scheme is based on channel capacity information calculated using the linear reception scheme and at least one other antenna scheduling scheme is based on channel capacity information calculated using the nonlinear reception scheme, selecting an antenna scheduling scheme, from the at least two antenna scheduling schemes, having a higher system capacity, and allocating transmission antennas to the plurality of user equipments using the selected antenna scheduling scheme;

wherein the base station calculates a first system capacity using a Max Link Technique (MLT) scheme when the MLT scheme is used as one of the at least two antenna scheduling schemes, calculates a second system capacity using an Independent Stream Technique (IST) scheme when the IST scheme is used as one of the at least two antenna scheduling schemes, and selects the antenna scheduling scheme corresponding to a larger system capacity value, and wherein the first system capacity is calculated by $$C_M(t) = \max_k \sum_m c_f(\gamma_{k,m}(t)), \text{ and}$$

the second system capacity is calculated by $$C_I(t) = \sum_m \max_k c_f(\gamma_{k,m}(t)),$$

where $C_M(t)$ denotes the first system capacity, $C_I(t)$ denotes the second system capacity, $c_f(\gamma_{k,m}(t))$ denotes a system capacity calculated using a signal-to-noise ratio (SNR) of a channel established from an m-th transmission antenna to a k-th user equipment.

2. A method for transmitting and receiving data in a multiuser Multiple-Input Multiple-Output (MIMO) system including a base station connected to a plurality of user equipments, the method comprising the steps of:

calculating, by each of the plurality of user equipments, a set of channel capacity information using a linear reception scheme and a set of channel capacity information using a nonlinear reception scheme;

feeding back the calculated channel capacity information to the base station;

separately calculating, by the base station, system capacities using at least two different antenna scheduling schemes based on the sets of channel capacity information fed back from the plurality of user equipments, wherein at least one antenna scheduling scheme is based on channel capacity information calculated using the linear reception scheme and at least one other antenna scheduling scheme is based on channel capacity information calculated using the nonlinear reception scheme;

selecting an antenna scheduling scheme, from the at least two antenna scheduling schemes, having a higher system capacity; and allocating transmission antennas to the plurality of user equipments using the selected antenna scheduling scheme;

wherein selecting the antenna scheduling scheme comprises:

calculating a first system capacity using a Max Link Technique (MLT) scheme when the MLT scheme is used as one of the at least two antenna scheduling schemes, calculating a second system capacity using an Independent Stream Technique (IST) scheme when the IST scheme is used as one of the at least two antenna scheduling schemes, and selecting the antenna scheduling scheme corresponding to a larger system capacity value; and wherein the first system capacity is calculated by $$C_M(t) = \max_k \sum_m c_f(\gamma_{k,m}(t)), \text{ and}$$

the second system capacity is calculated by $$C_I(t) = \sum_m \max_k c_f(\gamma_{k,m}(t)),$$

where $C_M(t)$ denotes the first system capacity, $C_I(t)$ denotes the second system capacity, $c_f(\gamma_{k,m}(t))$ denotes a system capacity calculated using a signal-to-noise ratio (SNR) of a channel established from an m-th transmission antenna to a k-th user equipment.

3. A method for transmitting and receiving data in a multiuser Multiple-Input Multiple-Output (MIMO) system in which a base station allocates antennas based on channel state information received from terminals located within a coverage area of the base station, the method comprising the steps of:

receiving sets of channel capacity information from the terminals, wherein each of the terminals calculated a set of channel capacity information using a linear reception scheme and a set of channel capacity information using a nonlinear reception scheme;

separately calculating system capacities using at least two different antenna scheduling schemes based on the sets of channel capacity information received from all of the terminals, wherein at least one antenna scheduling scheme is based on channel capacity information calculated using the linear reception scheme and at least one other antenna scheduling scheme is based on channel capacity information calculated using the nonlinear reception scheme;

selecting an antenna scheduling scheme, from the at least two antenna scheduling schemes, having a higher system capacity; and allocating transmission antennas using the selected antenna scheduling scheme;

wherein selecting the antenna scheduling scheme comprises:

calculating a first system capacity using a Max Link Technique (MLT) scheme when the MLT scheme is used as one of the at least two antenna scheduling schemes, calculating a second system capacity using an Independent Stream Technique (IST) scheme when the IST scheme is used as one of the at least two antenna scheduling schemes, and selecting the antenna scheduling scheme corresponding to a larger system capacity value; and wherein the first system capacity is calculated by $$C_M(t) = \max_k \sum_m c_f(\gamma_{k,m}(t)), \text{ and}$$

the second system capacity is calculated by $$C_I(t) = \sum_m \max_k c_f(\gamma_{k,m}(t)),$$

where $C_M(t)$ denotes the first system capacity, $C_I(t)$ denotes the second system capacity, $d_f(\gamma_{k,m}(t))$ denotes a system capacity calculated using a signal-to-noise ratio (SNR) of a channel established from an m-th transmission antenna to a k-th user equipment.

* * * * *